United States Patent
Knaak

(10) Patent No.: US 10,333,389 B2
(45) Date of Patent: Jun. 25, 2019

(54) CONVERTER MODULE FOR A MULTI-STAGE CONVERTER AND METHOD FOR OPERATING SAID CONVERTER MODULE

(71) Applicant: SIEMENS AKTIENGESELLSCHAFT, Munich (DE)

(72) Inventor: Hans-Joachim Knaak, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/073,203

(22) PCT Filed: Feb. 8, 2016

(86) PCT No.: PCT/EP2016/052631
§ 371 (c)(1),
(2) Date: Jul. 26, 2018

(87) PCT Pub. No.: WO2017/137063
PCT Pub. Date: Aug. 17, 2017

(65) Prior Publication Data
US 2019/0044431 A1 Feb. 7, 2019

(51) Int. Cl.
*H02M 7/757* (2006.01)
*H02M 1/36* (2007.01)
*H02M 1/32* (2007.01)
*H02M 7/483* (2007.01)
(Continued)

(52) U.S. Cl.
CPC ............... *H02M 1/36* (2013.01); *H02M 1/32* (2013.01); *H02M 7/483* (2013.01); *H02M 7/1552* (2013.01); *H02M 7/2173* (2013.01); *H02M 7/7575* (2013.01); *H02M 2007/4835* (2013.01)

(58) Field of Classification Search
CPC ............. H02M 7/1552; H02M 7/2173; H02M 7/7575; H02M 1/36; H02M 7/483; H02M 1/32; H02M 2007/4835
USPC ...... 363/35, 67, 68, 69, 70, 84, 89, 92, 127, 363/129
See application file for complete search history.

(56) References Cited

U.S. PATENT DOCUMENTS 10,122,296 B2 * 11/2018 Sakano .................. H02M 7/48
2013/0169612 A1 * 7/2013 Woo .......................... H02J 1/00
345/211

(Continued)

FOREIGN PATENT DOCUMENTS

DE 102011006345 A1 10/2012
WO 2013060354 A1 5/2013

*Primary Examiner* — Alex Torres-Rivera
(74) *Attorney, Agent, or Firm* — Laurence Greenberg; Werner Stemer; Ralph Locher

(57) ABSTRACT

A converter module for a multi-stage converter includes an energy storage device connected in parallel with a series circuit of a first and a second semiconductor switching unit. At least one of the semiconductor switching units has a bidirectional switch. A switch-on unit is connected in parallel with the bidirectional switch. With the switch-on unit there can be produced a switch-on voltage for switching on the bidirectional switch from a voltage dropping across the bidirectional switch. There is also disclosed a multi-stage converter having the novel converter module and a method for operating the converter module.

9 Claims, 2 Drawing Sheets

(51) Int. Cl.
*H02M 7/217* (2006.01)
*H02M 7/155* (2006.01)

(56) References Cited

U.S. PATENT DOCUMENTS

| | | | |
|---|---|---|---|
| 2013/0208519 A1* | 8/2013 | Yamamoto | H02M 7/12 363/67 |
| 2014/0362628 A1 | 12/2014 | Eckel | |
| 2018/0083550 A1* | 3/2018 | Chung | H02M 1/32 |
| 2018/0131291 A1* | 5/2018 | Lavieville | H02M 7/483 |
| 2018/0166994 A1* | 6/2018 | Dorn | H02H 9/04 |

* cited by examiner

CONVERTER MODULE FOR A MULTI-STAGE CONVERTER AND METHOD FOR OPERATING SAID CONVERTER MODULE

BACKGROUND OF THE INVENTION

Field of the Invention

The present invention relates to a converter module for a multi-stage converter, comprising an energy storage device connected in parallel with a series circuit of a first and a second semiconductor switching unit, wherein at least one of the semiconductor switching units comprises a bidirectional switch.

Such a converter module is known, for example, from WO 2013/060354 A1. The known converter module is part of a modular multi-stage converter. The modular multi-stage converter comprises a plurality of phase branches which respectively extend between a direct-current pole and an alternating-current terminal of the multi-stage converter. A series circuit of the two-pole converter modules is arranged in each of the phase branches. The known converter modules are configured as half-bridge circuits. One of two connecting terminals of the converter module is connected to the energy storage device. The other connecting terminal is arranged at a potential point between the two semiconductor switching units. The semiconductor switching unit arranged between the two connecting terminals, in the so-called bridge arm of the converter module, comprises the bidirectional switch. The other semiconductor switching unit comprises a semiconductor switch which can be switched on and off and which has a reverse and forward direction, wherein a flyback diode is connected anti-parallel to the semiconductor switch, i.e., opposite the forward direction of the semiconductor switch. The bidirectional switch in the context of WO 2013/060354 A1 is a semiconductor switch or an arrangement of individual semiconductor switches which can be switched on and off in both current directions. A forward direction of the bidirectional switch may be defined as the forward direction of the series-connected semiconductor switch of the other semiconductor switching unit. Correspondingly, a reverse direction of the bidirectional switch may be defined as the forward direction of the flyback diode. The bidirectional switch is controllable in both directions, independently of one another, by means of a suitable control device. Due to the blocking capability of the bidirectional switch in its reverse direction, the known converter module may be used to switch off a short-circuit current on a direct-current side of the multi-stage converter.

In order to ensure reliable operation of the multi-stage converter with the known converter module, the energy storage device of the converter module must be precharged upon commissioning. However, if the bidirectional switch is initially blocked, and if the control device does not have an active power supply, precharging the energy storage device cannot be ensured. This may, for example, be the case in particular if the power supply of the control device is fed from the energy storage device of the converter module.

SUMMARY OF THE INVENTION

The object of the present invention is to provide a generic converter module which enables the most reliable possible operation of the multi-stage converter.

This object is achieved with a generic converter module in that a switch-on unit is provided in parallel with the bidirectional switch, by means of which a switch-on voltage for switching on the bidirectional switch can be generated from a voltage dropping across the bidirectional switch.

If the converter module is connected to an AC voltage grid, for example, along with other converter modules of a multi-stage converter, a voltage Uz drops across the bidirectional switch. The switch-on voltage may be generated from this voltage Uz by means of the switch-on unit. The switch-on voltage may, for example, be a voltage at a control terminal of the bidirectional switch, wherein the application of the switch-on voltage at the control terminal may cause the bidirectional switch to switch on. In this case, it may be sufficient if the bidirectional switch can be switched on only in its forward direction or only in its reverse direction by means of the switch-on unit, or rather, the generated switch-on voltage. If the converter module, for example, is configured as a semiconductor circuit, like the known converter module, it is sufficient to switch on the bidirectional switch arranged in the bridge arm in its reverse direction by means of the switch-on unit.

The bidirectional switch in the context of the present invention is accordingly a semiconductor switch having a blocking capability both in the forward and reverse directions. The bidirectional switch may, for example, be implemented as an assembly comprising two semiconductors which are capable of blocking and which are arranged in anti-parallel. With respect to other examples of, and details about, the configuration of the bidirectional switch, reference is hereby made to the aforementioned WO 2013/060354 A1.

According to a preferred embodiment of the present invention, the switch-on voltage can be generated via voltage division of the voltage dropping across the bidirectional switch. In this manner, the switch-on voltage required for switching on the bidirectional switch can be generated in a particularly simple manner. The voltage division is advantageously implemented via a voltage divider circuit in parallel with the bidirectional switch. The voltage divider circuit suitably has a high resistance.

Preferably, the switch-on unit comprises a deactivation switch, by means of which the switch-on unit can be deactivated. Accordingly, control of the bidirectional switch, or rather, the semiconductor switching unit comprising the bidirectional switch, is decoupled from the switching on of the bidirectional switch by means of the switch-on unit during normal operation of the converter module, i.e., while the energy supply to the control device is ensured. As soon as the energy supply to the control device is ensured, said control device assumes control of the bidirectional switch. In this case, the switch-on unit is deactivated. The deactivation may, for example, take place as soon as the energy storage device of the converter module is sufficiently or completely charged. A suitable detection device detects, for example, whether the energy storage device is sufficiently charged according to a predetermined condition, and initiates switching off, or rather, blocking, of the deactivation switch, so that the switch-on unit is deactivated.

According to an advantageous refinement of the present invention, the switch-on unit comprises a first divider branch between a first terminal of the bidirectional switch and a central potential point, a second divider branch between a second terminal of the bidirectional switch and the central potential point, and a control branch between a control terminal of the bidirectional switch and the central potential point. In this case, the first and second divider branches respectively comprise at least one resistance element. The resistance elements are dimensioned in such a way that the switch-on voltage for switching on the bidirectional switch can be generated by means of voltage division of the voltage dropping across the bidirectional switch. The switch-on unit accordingly corresponds to a voltage divider circuit, by means of which the voltage dropping across the bidirectional switch is divided. Thus, a particularly simple design of the switch-on unit is provided. If the bidirectional switch has a plurality of control terminals due to its configuration, the control branch may advantageously connect the central potential point to only one of the control terminals. For example, the control branch connects the central potential point to the control terminal for switching the bidirectional switch in the reverse direction. It is particularly advantageous if the voltage conductor circuit comprises divider resistors. For example, a first divider resistor is arranged in the first divider branch, and a second divider resistor is arranged in the second divider branch. The divider resistors are suitably dimensioned for generating the switch-on voltage.

The deactivation switch is suitably arranged in the first or second divider branch. The control branch may thus advantageously be used during normal operation for controlling the bidirectional switch, as part of a connection of the control terminal to the control device.

Preferably, the deactivation switch is a semiconductor switch which is passively conductive in its forward direction and which can be switched off. Via the passively conductive deactivation switch, a switch-on unit is provided which generally does not require its own power supply. For example, passive voltage division may thus be achieved.

Preferably, the deactivation switch is a JFET (junction gate field-effect transistor) switch. Such a switch is known to those skilled in the art as a passively conductive semiconductor which is capable of blocking.

According to another embodiment of the present invention, the bidirectional switch comprises a first controllable semiconductor switch which can be switched on and off, and a second controllable semiconductor switch which can be switched on and off, wherein the second semiconductor switch is arranged anti-parallel to the first semiconductor switch. According to this embodiment, preferably, the first divider branch is arranged between an emitter terminal of the first semiconductor switch and a central potential point, the second divider branch is arranged between a collector terminal of the first semiconductor switch and the central potential point, and the control branch is arranged between a control terminal of the first semiconductor switch and the central potential point. The two semiconductor switches of the bidirectional switch according to this embodiment of the present invention may, for example, be arranged within the converter module in such a way that blocking the first semiconductor switch enables blocking of the bidirectional switch in its reverse direction. In this case, the divider branches may also be routed to the terminals of the bidirectional switch via other components of the switch-on unit, or rather, of the bidirectional switch, or rather, of the associated semiconductor switching unit.

According to another embodiment of the present invention, a second connecting terminal of the converter module is connected to the energy storage device, and a first connecting terminal of the converter module is connected to a potential point between the two semiconductor switching units. According to this embodiment of the present invention, the converter module forms a half-bridge circuit with a series circuit of the two semiconductor switching units and the energy storage device connected in parallel with the series circuit.

Preferably, in the previously described half-bridge circuit, only the semiconductor switching unit arranged between the two connecting terminals comprises a bidirectional switch. The remaining semiconductor switching unit may be implemented as an IGBT switch with a diode which is connected in anti-parallel. In this way, a particularly advantageous embodiment of the converter module is provided with respect to the power loss.

The present invention furthermore relates to a multi-stage converter comprising a converter branch which is arranged between a DC voltage terminal and an AC voltage terminal, wherein the converter branch comprises a series circuit of two-pole converter modules, wherein at least one of the converter modules comprises a bidirectional switch.

Such a multi-stage converter is, for example, known from the previously cited publication WO 2013/060354 A1.

The object of the present invention is to provide such a multi-stage converter which is as reliable as possible during operation.

This object is achieved with a generic multi-stage converter, in that a switch-on unit is provided in parallel with the bidirectional switch, by means of which a switch-on voltage for switching on the bidirectional switch can be generated from a voltage dropping across the bidirectional switch.

The advantages of the multi-stage converter according to the present invention result accordingly from the previously described advantages of the converter module according to the present invention.

The multi-stage converter may, for example, be arranged between an alternating-current grid and a direct-current grid. The AC voltage terminal of the multi-stage converter may, for example, be connectable to the alternating-current grid via a suitable transformer.

Moreover, all previously described embodiment variants of the converter module according to the present invention may be used separately or in combination in the multi-stage converter according to the present invention.

Due to the blocking capability of the converter modules of the multi-stage converter, regardless of the polarity of the current flowing through the multi-stage converter, the multi-stage converter according to the present invention is particularly suitable for being used in high-voltage direct-current transmission (HVDC) systems which transmit electrical power in or out of a branched and/or meshed direct-current grid.

The present invention furthermore relates to a method for operating a converter module of a multi-stage converter comprising an energy storage device connected in parallel with a series circuit of two semiconductor switching units, wherein at least one of the semiconductor switch units comprises a bidirectional switch.

The object of the present invention is to provide such a method which enables operation of the converter module which is as reliable as possible.

This object is achieved via a generic method in which a switch-on unit is provided in parallel with the bidirectional switch, and for precharging the energy storage device by means of the switch-on unit, a switch-on voltage for switching on the bidirectional switch is generated from a voltage dropping across the bidirectional switch.

The method according to the present invention enables reliable precharging, and thus the reliable operation, of the energy storage device of the converter module.

BRIEF DESCRIPTION OF THE SEVERAL VIEWS OF THE DRAWING

The present invention is to be described in greater detail below, based on FIGS. 1 to 3.

DESCRIPTION OF THE INVENTION

Figure 1:
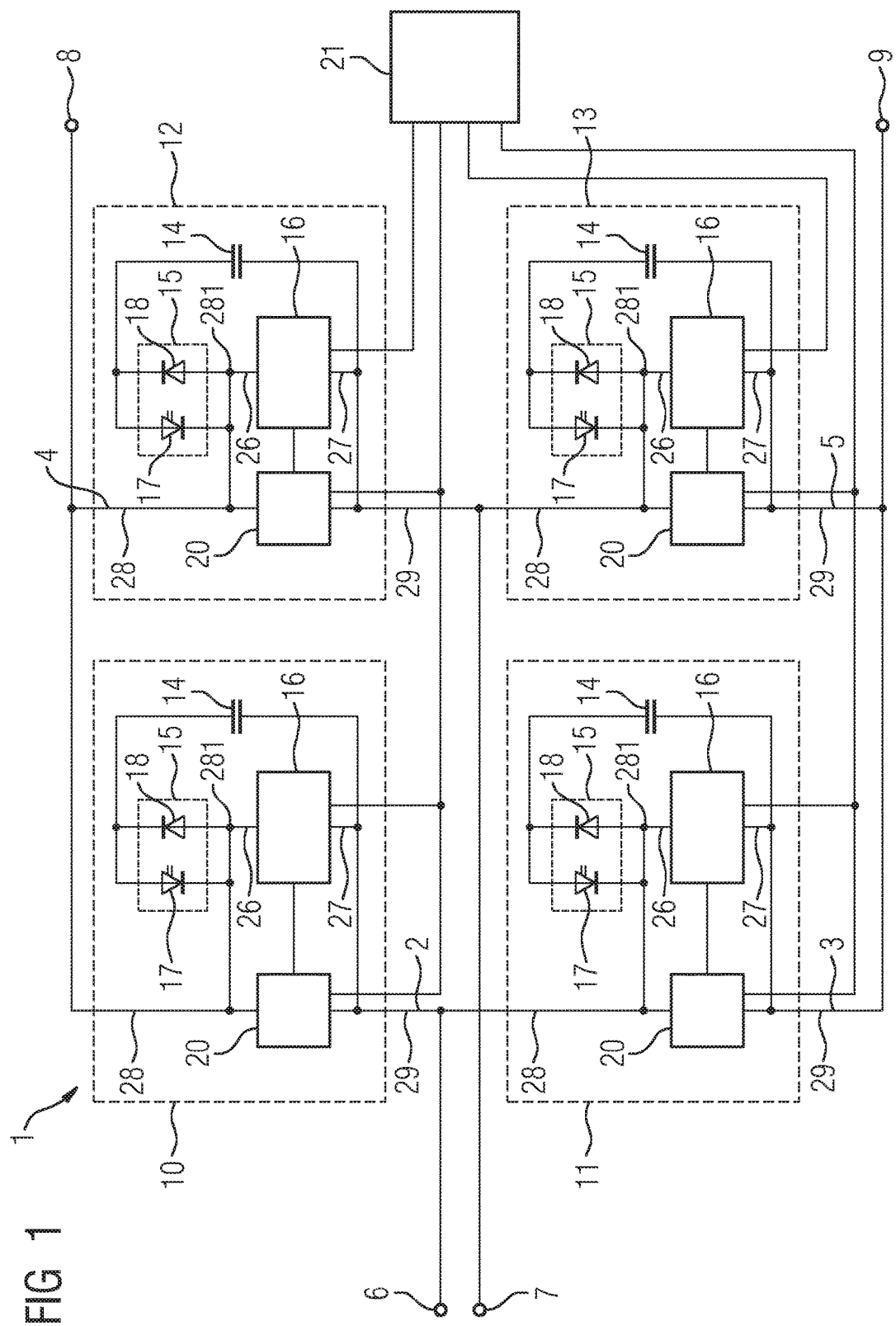
FIG. 1 shows a schematic representation of an exemplary embodiment of a multi-stage converter according to the present invention, comprising a converter module according to the present invention.

FIG. 1 depicts a multi-stage converter 1 in detail. The multi-stage converter 1 comprises a first phase branch 2 which extends between a first AC voltage terminal 6 and a first DC voltage terminal 8. Furthermore, the multi-stage converter 1 comprises a second phase branch 3 which extends between the first AC voltage terminal 6 and a second DC voltage terminal 9, a third phase branch 4 which extends between a second AC voltage terminal 7 and the first DC voltage terminal 8, and a fourth phase branch 5 which extends between the second AC voltage terminal 7 and the second DC voltage terminal 9. The AC voltage terminals 6, 7 are configured to connect the multi-stage converter 1 to an alternating-current grid, which is not depicted in the figure. The DC voltage terminals 8, 9 are configured to connect the multi-stage converter 1 to a direct-current grid, which is not depicted in the figure. In this case, the DC voltage line to be connected to the DC voltage terminals 8, 9 is made up of two DC voltage conductors, wherein one of the DC voltage conductors may also be provided via a ground connection.

In the exemplary embodiment depicted in FIG. 1, the alternating-current grid to be connected is two-phase; thus, the multi-stage converter 1 is also configured to be two-phase. Within the scope of the present invention, it is of course also possible to configure the multi-stage converter 1 to have three or more phases, wherein in such a case, the multi-stage converter may be extended to additional phase branches in a manner known to those skilled in the art.

A series circuit of two-pole converter modules is arranged in the first phase branch 2, wherein only a first converter module 10 is graphically depicted in FIG. 1 for reasons of clarity. The additional converter modules, which are not depicted in the figures, have the same configuration as the first converter module 10. Correspondingly, a series circuit of converter modules is arranged in the second phase branch 3, of which only a second converter module 11 is graphically depicted. In the same manner, the third phase branch 4 comprises a series circuit of converter modules, of which only a third converter module 12 is graphically depicted, and finally, the fourth phase branch 5 likewise comprises a series circuit of converter modules, of which only a fourth converter module 13 is depicted. In the exemplary embodiment depicted in FIG. 1, all converter modules, both the ones which are graphically depicted and the ones which are not graphically depicted, are configured identically.

Using the example of the first converter module 10, the inner configuration of said converter module will be described below in greater detail. The first converter module 10 comprises an energy storage device in the form of a capacitor 14. A series circuit made of a first semiconductor switching unit 15 and a second semiconductor switching unit 16 is arranged in parallel with the capacitor 14.

The first semiconductor switching unit 15 comprises a semiconductor switch 17 which can be switched on and off, to which a flyback diode 18 is connected in anti-parallel. The forward direction of the flyback diode 18 is opposite the blockable forward direction of the semiconductor switch 17. The semiconductor switch 17 is, for example, a gate turn-off (GTO) thyristor or an insulated-gate bipolar transistor (IGBT) or an integrated gate-commutated thyristor (IGCT).

The second semiconductor switching unit 16 comprises a bidirectional switch 19, the configuration of which will be discussed in greater detail in FIG. 2. The bidirectional switch 19 is configured as a two-pole device and comprises a first terminal 26 and a second terminal 27.

A switch-on unit 20 is arranged in parallel with the second semiconductor switching unit 16, or rather, the bidirectional switch 19. The configuration of the switch-on unit 20 will be described in greater detail in conjunction with the description of FIG. 3.

The second semiconductor switching unit 16 is connected to a control device 21. The first semiconductor switching unit 15 is also connected to the control device 21, which, however, is not depicted graphically in FIG. 1 for reasons of clarity. The control device 21 is configured to control the semiconductor switches of the first converter module 10, according to a predetermined control algorithm. The control device 21 also assumes control of all remaining semiconductor switches in all converter modules of the multi-stage converter 1.

In the present exemplary embodiment, the switch-on unit 20 is designed to be controllable. The control device 21 assumes control of the switch-on unit 20, or rather, controllable components of the switch-on unit 20.

A first connecting terminal 28 of the first converter module 10 is connected to a potential point 281 between the first and second semiconductor switching units 15 and 16. A second connecting terminal 29 is directly connected to a pole of the capacitor 14. Accordingly, the first converter module 10 forms a half-bridge circuit.

Figure 2:
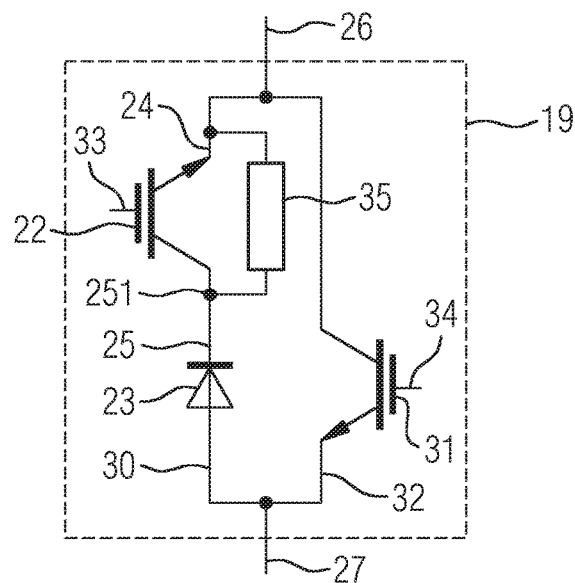
FIG. 2 shows a schematic representation of an exemplary embodiment of a bidirectional switch.

FIG. 2 shows an exemplary embodiment of a bidirectional switch 19 of one of the converter modules 10 to 13 of the multi-stage converter 1 of FIG. 1. A first IGBT 22 is connected in series with a diode 23, wherein the emitter 24 of the IGBT 22 and the cathode 25 of the diode 23 are oriented in the direction of the first terminal 16. The emitter 24 of the first IGBT 22 is connected to the first terminal 26, and the anode 30 of the diode 23 is connected to the second terminal 27. A second IGBT 31 is arranged in parallel with the series circuit made up of the first IGBT 22 and the diode 23. The emitter 32 of the second IGBT 31 is connected to the second terminal 27 of the bidirectional switch 19. The first and second IGBTs 22 and 31 may be controlled, i.e., switched on and off, by means of their control terminals 33 and 34. In an initial state of the bidirectional switch during commissioning of the multi-stage converter 1, the bidirectional switch 19 is generally in a blocked state. In this state, both IGBTs 22, 31 are blocking, so that the connection between the first terminal 26 and the second terminal 27 is not electrically conductive. Generally, such a bidirectional switch may have a breakdown voltage ranging from 1 kV to more than 5 kV.

An overvoltage protection unit 35 is arranged in parallel with the first IGBT 22. Overvoltages across the first IGBT 22 may be limited by means of the overvoltage protection unit 35. The overvoltage protection unit 35 may, for example, comprise one or a plurality of resistors and/or surge arresters.

Figure 3:
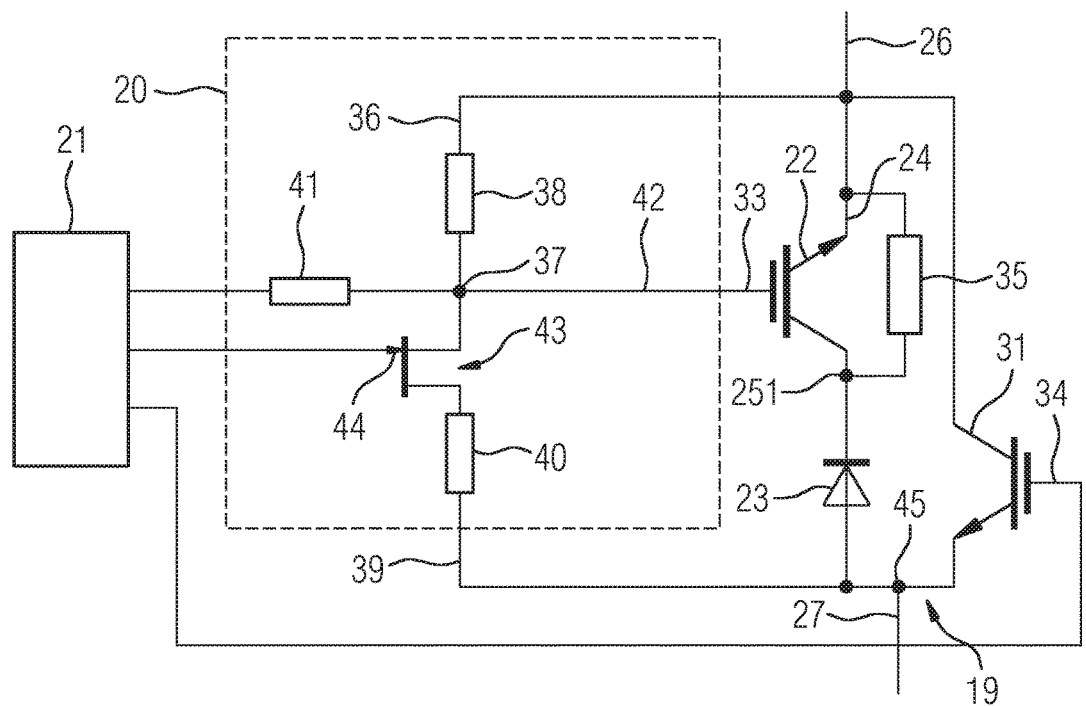
FIG. 3 shows a schematic representation of an exemplary embodiment of a switch-on unit.

FIG. 3 depicts the switch-on unit 20 of the first converter module 10 from FIG. 1. The switch-on unit 20 is explained here in conjunction with the bidirectional switch 19 of FIG. 2. However, a corresponding configuration of the switch-on unit 20 may also be used in conjunction with bidirectional switches having a different configuration.

The switch-on unit 20 has the configuration of a voltage divider. It comprises a first divider branch 36, which extends between the first terminal 26 of the bidirectional switch 19 and a central potential point 37. A first divider resistor 38 is arranged in the first divider branch 36. The switch-on unit 20 furthermore comprises a second divider branch 39, which extends between the second terminal 27 of the bidirectional switch 19 and the central potential point 37. A second divider resistor 40 is arranged in the second divider branch 39. Alternatively, the second divider branch 39 may also be routed via the diode 23 to the second terminal 27.

The central potential point 37 is furthermore connected to the control device 21 via an additional resistor 41. In addition, the switch-on unit 20 comprises a control branch 42 which connects the control terminal 33 of the first IGBT 22 to the central potential point 37 and thus also to the control device 21.

The switch-on unit 20 comprises a deactivation switch 43 which is arranged in the second divider branch 39 in series with the second divider resistor 40. The deactivation switch 43 is a JFET and is conductive in its initial state. The deactivation switch is designed for 3 kV in the present exemplary embodiment. A control terminal 44 of the deactivation switch 43 is also connected to the control device 21.

The functionality of the switch-on unit 20 is to be explained in greater detail below in conjunction with the previously described configuration of the converter module of the multi-stage converter 1 of FIG. 1.

In the initial situation, the multi-stage converter 1 is connected to an alternating-current grid. Accordingly, an alternating current is applied to the AC voltage terminals 6, 7. The capacitors 14 of the converter modules are to be charged from the alternating-current grid. In the present initial state, the bidirectional switch 19 is blocked in its reverse direction. In this case, the reverse direction corresponds to the forward direction of the flyback diodes 18.

During a first time span, the electrical potential at the first AC voltage terminal 6 is higher than the electrical potential at the second AC voltage terminal 7.

In this case, the current (technical current direction) in the first converter module 10 flows in the forward direction of the diode 23 in the bidirectional switch 19. Due to the voltage difference between the second terminal 27 of the bidirectional switch 19 and the control terminal 33 of the IGBT 22 in the bidirectional switch 19, the IGBT 22 is turned on. The current can flow though the bidirectional switch 19 of the first converter module 10, said bidirectional switch now being conductive in the reverse direction.

In the second converter module 11, the current flows via the flyback diode 18 of the second converter module 11 and charges the capacitor 14 of the second converter module 11.

In the third converter module 12, the current flows correspondingly via the flyback diode 18 of the third converter module 12 and charges the capacitor 14 of the third converter module 12.

In the fourth converter module 13, the current flows in the forward direction of the diode 23 in the bidirectional switch 19 of the fourth converter module 13. Due to the voltage difference between the second terminal 27 of the bidirectional switch 19 and the control terminal 33 of the IGBT 22 in the bidirectional switch 19, the IGBT 22 is turned on. The current can flow through the bidirectional switch 19 of the fourth converter module 13, which is conductive in the reverse direction.

With this polarity at the terminals 6 and 7, the capacitors 14 of the converter modules in the second and third phase branches 3 and 4 are accordingly charged.

Due to the AC voltage present at the AC voltage terminals 6, 7, the electrical potential at the first AC voltage terminal 6 is lower than the electrical potential at the second AC voltage terminal 7 during a second period of time.

In the case of a reversed polarity at the AC voltage terminals 6 and 7, the current direction is correspondingly reversed. Correspondingly, in the case of the reversed polarity of the current, the capacitors 14 in the first and fourth phase branches 2 and 5 are charged.

If all capacitors 14 of all converter modules are charged, the power supply of the control device 21 is also provided. In this case, the control device 21 may deactivate the switch-on unit 20 by means of a suitable control of the deactivation switch 43.

The invention claimed is:

1. A converter module for a multi-stage converter, comprising:
    a series circuit of a first semiconductor switching unit and a second semiconductor switching unit;
    at least one of said first and second semiconductor switching units having a bidirectional switch, said bidirectional switch having a first terminal, a second terminal and a control terminal;
    an energy storage device connected in parallel with said series circuit; and
    a switch-on unit connected in parallel with said bidirectional switch and configured to generate a switch-on voltage for switching on said bidirectional switch from a voltage dropping across said bidirectional switch-, said switch-on unit having:
    a first divider branch between said first terminal of said bidirectional switch and a central potential node;
    a second divider branch between said second terminal of said bidirectional switch and the central potential node; and
    a control branch between said control terminal of said bidirectional switch and the central potential node; and
    wherein said first and second divider branches respectively include at least one resistance element which are dimensioned in such a way that the switch-on voltage for switching on said bidirectional switch is generated by a voltage division of the voltage dropping across said bidirectional switch.

2. The converter module according to claim 1, wherein said switch-on unit comprises a deactivation switch enabling said switch-on unit to be deactivated.

3. The converter module according to claim 2, wherein the deactivation switch is arranged in one of said first or second divider branches.

4. The converter module according to claim 3, wherein said deactivation switch is a semiconductor switch which is passively conductive in a forward direction thereof and which can be switched off.

5. The converter module according to claim 4, wherein said deactivation switch is a junction field effect transistor switch.

6. The converter module according to claim 1, wherein:
    said bidirectional switch comprises a first controllable semiconductor switch which can be switched on and off, and a second controllable semiconductor switch which can be switched on and off, and wherein said second semiconductor switch is arranged anti-parallel to said first semiconductor switch;
    said first divider branch is arranged between an emitter terminal of said first semiconductor switch and a central potential node;

said second divider branch is arranged between a collector terminal of said first semiconductor switch and the central potential node; and said control branch is arranged between a control terminal of said first semiconductor switch and the central potential node.

7. The converter module according to claim 1, which comprises a first connecting terminal connected to a potential node between said first and second semiconductor switching units, and a second connecting terminal connected to said energy storage device.

8. The converter module according to claim 7, wherein said second semiconductor switching unit is arranged between said first and second connecting terminals, and only said second semiconductor switching unit comprises the bidirectional switch.

9. A multi-stage converter, comprising: a converter branch connected between a DC voltage terminal and an AC voltage terminal; said converter branch including a series circuit of two-pole converter modules, said two-pole converter modules including at least one converter module with a bidirectional switch, said at least one converter module including:
a series circuit of a first semiconductor switching unit and a second semiconductor switching unit;
at least one of said first and second semiconductor switching units having said bidirectional switch, said bidirectional switch having a first terminal, a second terminal and a control terminal;
an energy storage device connected in parallel with said series circuit; and
a switch-on unit connected in parallel with said bidirectional switch and configured to generate a switch-on voltage for switching on said bidirectional switch from a voltage dropping across said bidirectional switch, said switch-on unit having:
a first divider branch between said first terminal of said bidirectional switch and a central potential node:
a second divider branch between said second terminal of said bidirectional switch and the central potential node; and
a control branch between said control terminal of said bidirectional switch and the central potential node; and
wherein said first and second divider branches respectively include at least one resistance element which are dimensioned in such a way that the switch-on voltage for switching on said bidirectional switch is generated by a voltage division of the voltage dropping across said bidirectional switch.

* * * * *